United States Patent
Bansal et al.

(10) Patent No.: US 7,992,045 B2
(45) Date of Patent: Aug. 2, 2011

(54) IDENTIFYING AND MONITORING ASYNCHRONOUS TRANSACTIONS

(75) Inventors: Jyoti Kumar Bansal, San Francisco, CA (US); Kartik Shankaranarayanan, Shrewsbury, MA (US); Aditya Pandit, Northborough, MA (US); Haroon Rashid Ahmed, Mississauga, CA (US); Stuart Todd Rader, Menlo Park, CA (US)

(73) Assignee: Computer Associates Think, Inc., Islandia, NY (US)

( * ) Notice: Subject to any disclaimer, the term of this patent is extended or adjusted under 35 U.S.C. 154(b) by 310 days.

(21) Appl. No.: 12/326,619

(22) Filed: Dec. 2, 2008

(65) Prior Publication Data

US 2010/0138703 A1 Jun. 3, 2010

(51) Int. Cl.
*G06F 11/00* (2006.01)
(52) U.S. Cl. ....................................... 714/38.1
(58) Field of Classification Search .............. 714/18, 714/25, 26, 37–39, 46, 47–49, 57
See application file for complete search history.

(56) References Cited

U.S. PATENT DOCUMENTS

| | | | |
|---|---|---|---|
| 6,873,995 B2 * | 3/2005 | Benson et al. | 707/607 |
| 2003/0200212 A1 * | 10/2003 | Benson et al. | 707/7 |
| 2003/0236938 A1 * | 12/2003 | Bennett | 710/305 |
| 2004/0075690 A1 | 4/2004 | Cirne | |
| 2004/0078691 A1 | 4/2004 | Cirne et al. | |
| 2005/0021529 A1 * | 1/2005 | Hodson et al. | 707/100 |
| 2005/0251574 A1 * | 11/2005 | Chagoly et al. | 709/227 |
| 2007/0143323 A1 | 6/2007 | Vanrenen et al. | |
| 2009/0157766 A1 * | 6/2009 | Shen et al. | 707/202 |
| 2009/0216874 A1 * | 8/2009 | Thain et al. | 709/224 |

* cited by examiner

*Primary Examiner* — Nadeem Iqbal
(74) *Attorney, Agent, or Firm* — Vierra Magen Marcus & DeNiro LLP

(57) ABSTRACT

Monitoring asynchronous transactions in a computing environment is disclosed. A first unique identifier is determined when a first method executes. The identifier is associated with an asynchronous transaction. A second unique identifier is determined when a second method executes. If it is determined that the first unique identifier and the second unique identifier match, then is it determined that the asynchronous transaction started with the first method and completed with the second method. In one embodiment, code that identifies a routine that has instructions for determining the first unique identifier at runtime is added to the first method, and code that identifies a routine that has instructions for determining the second unique identifier at runtime is added to the second method.

25 Claims, 11 Drawing Sheets

306

| MyAsyncStartTracer |
| --- |
| { From specific } |
| *Operations* |
| public MyAsyncStartTracer( IAgent agent, AttributeListing parameters, ProbeIdentification probe, Object sampleTracedObject ) |
| *Operations Redefined From AAsyncStartTracer* |
| protected long getStallTimeout( InvocationData invocationData )<br>protected String getAsyncId( InvocationData data )<br>protected boolean doProcessing( InvocationData data )<br>protected String getResourceNameSuffix( InvocationData data ) |

| MyAsyncFinishTracer |
| --- |
| { From specific } |
| *Operations* |
| public MyAsyncFinishTracer( IAgent agent, AttributeListing parameters, ProbeIdentification probe, Object sampleTracedObject ) |
| *Operations Redefined From AAsyncFinishTracer* |
| protected boolean isError( InvocationData invocationData )<br>protected boolean isLastResponse( InvocationData data )<br>protected String getAsyncId( InvocationData data )<br>protected boolean doProcessing( InvocationData data )<br>protected String getResponseType( InvocationData data )<br>protected boolean doMetricsByResponseType( InvocationData data )<br>protected String getResourceNameSuffix( InvocationData data ) |

| AsyncTxTraceCounters |
| --- |
| { From async } |
| *Operations* |
| public AsyncTxTraceCounters( DataAccumulatorFactory dataAccumFactory_, String asyncTransactionName_ ) |
| public void disableMetrics( ) |
| public void recordRequest( String transactionId, long startTime, long stallTimeout ) |
| public void recordResponse( String transactionId, long endTime, boolean processMetricsByRespType, String responseType ) |
| public void recordLastResponse( String transactionId, long endTime, boolean processMetricsByRespType, String responseType ) |
| public void recordError( String transactionId, long endTime, boolean processMetricsByRespType, String responseType ) |
| private void recordMetricsByResponseType( boolean processMetricsByRespType, String responseType, long responseTime ) |
| public long getConcurrentInvocations( ) |
| *Operations Redefined From IAsyncTxStallProcessor* |
| public void processStalledTransaction( String transactionId ) |

| AsyncTxTraceRecord |
| --- |
| { From async } |
| *Operations* |
| public AsyncTxTraceRecord( String transactionId_, long startTime_, IAsyncTxStallProcessor stallProcessor_ ) |
| public TimerTask getStallTimerTask( ) |
| public long getStartTime( ) |
| public void cancelTasks( ) |

Fig. 8B

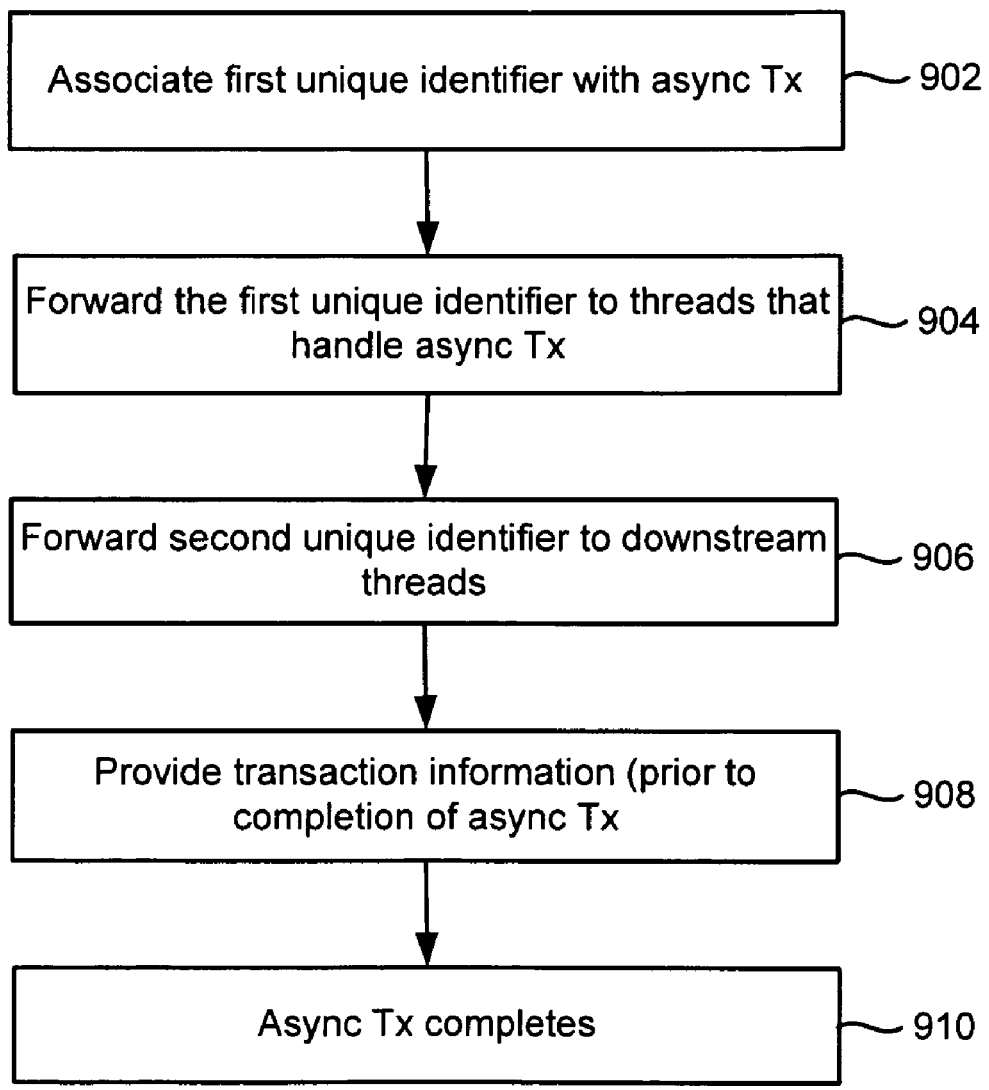

IDENTIFYING AND MONITORING ASYNCHRONOUS TRANSACTIONS

BACKGROUND OF THE INVENTION

Background

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live web applications and web sites to make sure that they are running properly.

One particular scenario that web application developers seek to avoid is a task that runs too slowly. For example, it may be expected that a task will take a fraction of one second to complete its functions; however, due to something going wrong, the task executes for thirty seconds. A task running too slowly can degrade performance of a web site, degrade performance of a web application, and cause an application to fail, or cause a web site to fail. Thus, there is a need to avoid poorly performing tasks.

When an application is performing poorly, the developer or administrator usually attempts to debug the software to determine which code is causing the performance issues so that code can be fixed. While it is usually easy to detect when an application is performing poorly because the response time is noticeably slower, it is often very difficult to determine which portion of the software is responsible for the poor performance. Even if the developer can determine which method, function, routine, process, etc. the application was performing when the issues occurred, it is not clear whether the problem was because of that method, function, routine, process, etc. or another method, function, routine, process, etc called by that method, function, routine, process, etc.

Determining a cause of the problem can be especially problematic for asynchronous transactions (although determining problems with synchronous transactions are problematic as well). A synchronous transaction involves a sequence of blocking method invocations in the same thread. A blocking method invocation means that when a first method invokes a second method, the first method ("calling method") waits for the second method ("called method") to complete. An asynchronous transaction is a sequence of method invocations in multiple threads. For an asynchronous transaction, the calling method does not wait for the called method to complete prior to continuing instruction execution. Because it can be difficult to monitor an asynchronous transaction across multiple threads it can be difficult to determine the cause of performance issues for asynchronous transactions.

SUMMARY OF THE INVENTION

Embodiments, roughly described, pertain to technology for monitoring asynchronous transactions in a computing environment. In some embodiments, a given asynchronous transaction involves multiple threads in the same process. In other embodiments, an asynchronous transaction involves multiple processes. Performance data about the asynchronous transactions is collected and reported.

In one embodiment, a first unique identifier is determined when a first point, which may be a method execution, in a first thread of a process executes. The identifier is associated with an asynchronous transaction. A second unique identifier is determined when a second point in a second thread of the process executes. If it is determined that the first unique identifier and the second unique identifier match, then it is determined that the asynchronous transaction started with the first point and completed with the second point.

In one embodiment, first code is added to a first point in a first thread in a process. The first point is associated with the start of an asynchronous transaction. The first code identifies a first routine that has first instructions for determining a first unique identifier at runtime. Second code is added to a second point which may execute in a second thread in the process. The second point is associated with the end of the asynchronous transaction. The second code identifies a second routine that has second instructions for determining a second unique identifier at runtime. A determination is made that an instance of the asynchronous transaction started with the first point and completed with the second point at least in part in response to determining that the first identifier and the second identifier match. In one implementation, the first routine initiates collection of metrics for the asynchronous transaction and the second routine completes collection of the metrics. For example, the first routine may establish a record to store metrics and a timer task. The second routine may update metrics in the record. If the asynchronous transaction fails to complete within an allotted time, the timer task cleans up the record and updates metrics that the transaction failed to complete in the allotted time.

One embodiment is a method for monitoring long-lived asynchronous transactions, which may execute in different processes. In one such embodiment, a first unique identifier is associated with an asynchronous transaction that starts in a first thread. The first unique identifier for the asynchronous transaction is forwarded to a second thread that handles the asynchronous transaction on behalf of the first thread. A second unique identifier for the asynchronous transaction is forwarded to a third thread that handles the asynchronous transaction downstream from the second thread. Transaction information for the asynchronous transaction is recorded. The transaction information pertains to execution of the asynchronous transaction in the second thread or prior to execution in the second thread. The recorded transaction information is provided in a user interface prior to completion of the asynchronous transaction. The second thread and the third thread may be in different processes.

One embodiment includes instrumenting bytecode (or object code) of an application to be monitored. The instrumented bytecode includes probes that monitor the asynchronous transactions of interest. Agent software receives information from the probes and performs the test described herein.

One embodiment can be accomplished using hardware, software, or a combination of both hardware and software. The software used for one embodiment is stored on one or more processor readable storage media including hard disk drives, CD-ROMs, DVDs, optical disks, floppy disks, tape drives, RAM, ROM, flash memories, or other suitable storage devices. In alternative embodiments, some or all of the software can be replaced by dedicated hardware including custom integrated circuits, gate arrays, FPGAs, PLDs, and special purpose computers. In one embodiment, software is used to program one or more processors. The processors can be in communication with one or more storage devices, peripherals and/or communication interfaces.

This summary is provided to introduce a selection of concepts in a simplified form that are further described below in the description. This summary is not intended to identify key

BRIEF DESCRIPTION OF THE DRAWINGS

FIG. 6A is one embodiment of an interface definition for an asynchronous start tracer.

FIG. 6B is one embodiment of an interface definition ace for an asynchronous finish tracer.

FIG. 8A is one embodiment of an interface definition for an asynchronous trace counter.

FIG. 8B is one embodiment of an interface definition for an asynchronous trace record.

FIG. 9 is a flow chart describing one embodiment of a process for reporting asynchronous transaction information prior to completion of an asynchronous transaction.

DETAILED DESCRIPTION

Technology described herein is directed to monitoring asynchronous transactions in a computing environment. Data is collected about the asynchronous transactions to identify which components of an asynchronous transaction may be executing too slowly. The data can include such things as the average amount of time asynchronous transitions are taking, stalled asynchronous transactions, whether transactions ended in errors, etc.

In one aspect, an asynchronous transaction involves a sequence of method invocations to perform a task. For example, the task might be a user login or placing a telephone call by voice over Internet (VoIP) protocol. However, the asynchronous transaction is not limited to method invocations. For example, the asynchronous transaction can be performed by one or more procedures, functions, or some other set of instructions. In some aspects, the asynchronous transaction spans multiple threads in the same process. In other aspects, the asynchronous transaction spans multiple processes. In one embodiment, the asynchronous transactions are implemented with methods in a Java environment. In that embodiment, an asynchronous transaction involves method invocations in a running software system that enters the Java Virtual Machine ("JVM") and exits the JVM (and all that it calls). The technology described herein is not limited to JAVA and/or JVM.

In one embodiment, a user, or another entity, can specify which asynchronous transactions are to be monitored by specifying a begin set of instructions and an end set of instructions for each asynchronous transaction. For example, a system administrator (user) specifies a method in which the asynchronous transaction begins and a method in which the asynchronous transaction ends. The two methods may be in different threads of the same process. In one embodiment, the reporting is performed by a Graphical User Interface ("GUI"). For each listed asynchronous transaction, a visualization can be provided that enables the user to immediately understand where time was spent in the monitored asynchronous transaction. Although an implementation described below is based on a Java application, embodiments can be used with other programming languages, paradigms and/or environments.

There are many ways to implement the technology described herein. One example is to implement an embodiment within an application performance management tool. One embodiment of such an application performance management tool monitors performance of an application by having access to the source code and modifying that source code. Sometimes, however, the source code is not available. Another type of tool performs application performance management without requiring access to or modification of the application's source code. Rather, the tool instruments the application's object code (also called bytecode).

Figure 1:
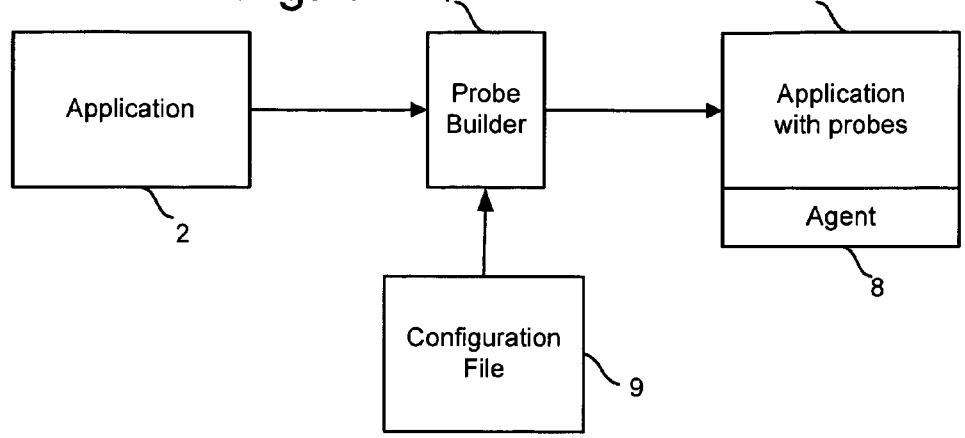
FIG. 1 is a block diagram describing how bytecode for an application is instrumented.

FIG. 1 depicts a block diagram depicting components for modifying an application's bytecode. FIG. 1 shows Application 2, Probe Builder 4, Application that has been modified with added probes 6, Agent 8, and configuration file 9. The configuration file 9 contains information supplied by a user (e.g., system administrator) that informs the probe builder 4 how and where to modify the application 2. For example, the configuration file 9 may specify a method in which an asynchronous transaction begins and a method in which the asynchronous transaction ends. Application 2 is the application (e.g., JAVA application) before the probes are added. Application 6 includes probes, which will be discussed in more detail below.

Probe Builder 4 instruments (e.g., modifies) the bytecode for Application 2 to add probes and additional code to Application 2 in order to create Application 6. The probes measure specific pieces of information about the application without changing the application's business logic. Agent 8 is installed on the same machine as managed Application 6. Once the probes have been installed in the bytecode, the Java application is referred to as a managed application. More information about instrumenting byte code can be found in U.S. Pat. No. 6,260,187 "System For Modifying Object Oriented Code" by Lewis K. Cirne; and U.S. patent application Ser. No. 09/795,901, "Adding Functionality To Existing Code At Exits," filed on Feb. 28, 2001, both of which are incorporated herein by reference in their entirety.

In one embodiment, bytecode is instrumented by adding new code that activates a monitoring mechanism when a first method starts and terminates the monitoring mechanism when a second method completes. The first method marks the starting point of the asynchronous transaction and the second method marks the ending point of the asynchronous transaction.

Figure 2:
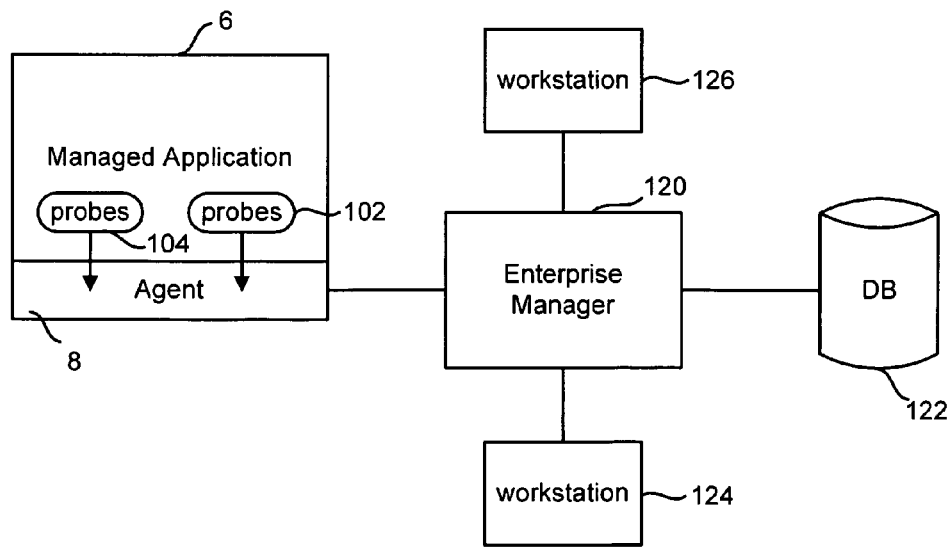
FIG. 2 is a block diagram of a system for monitoring an application. This system represents one example of a system that can implement the present invention.

FIG. 2 is a conceptual view of the components of the application performance management tool. In addition to managed Application 6 with probes 102 and 104, FIG. 2 also depicts Enterprise Manager 120, database 122, workstation 124 and workstation 126. As a managed application 6 runs, probes (e.g. 102 and/or 104) relay data to Agent 8. Agent 8 then collects and summarizes the data, and sends it to Enterprise Manager 120. Enterprise Manager 120 receives performance data from managed applications via Agent 8, runs requested calculations, makes performance data available to workstations (e.g. 124 and 126) and optionally sends performance data to database 122 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2, each of the components are running on different machines. That is, workstation 126 is on a first computing device, workstation 124 is on a second computing device, Enterprise Manager 120 is on a third computing device, and managed Application 6 and Agent 8 are running on a fourth computing device. In another embodiment, two or more (or all) of the components are operating on the same computing device. For example, managed application 6 and Agent 8 may be on a first computing device, Enterprise Manager 120 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, software is stored on one or more processor readable storage devices and is used to program one or more processors.

Figure 3:
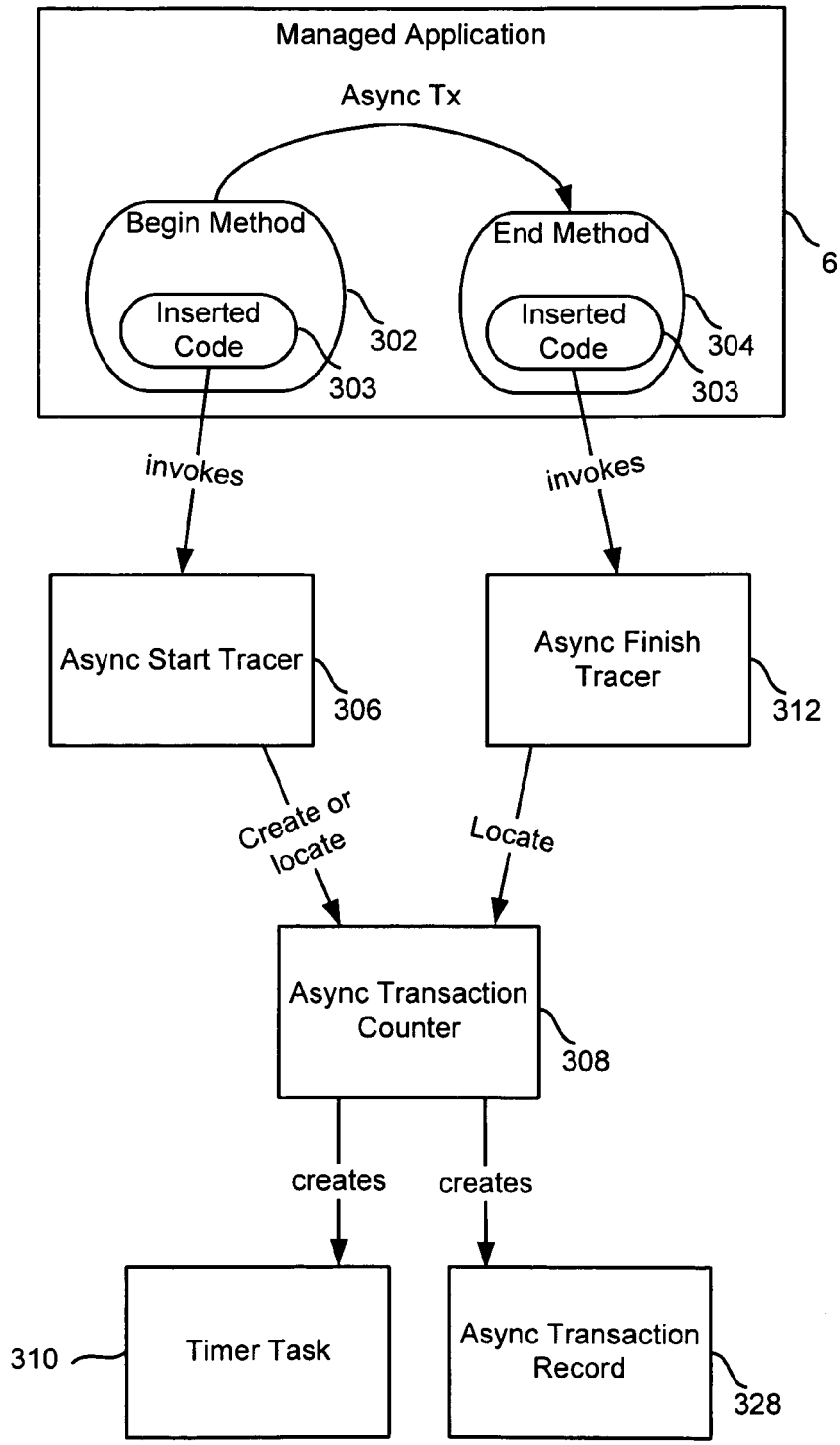
FIG. 3 is a block diagram of one embodiment of components for monitoring an application.

FIG. 3 is a diagram of one embodiment of components used to monitor asynchronous transactions. A single asynchronous transaction ("Async Tx") is represented in the managed application 6 as starting with the begin method 302 and finishing with the end method 304. In one embodiment, the begin method 302 is in one thread of a process and the end method 304 is in another thread of the same process. However, in some embodiments, the asynchronous transaction spans multiple processes. Note that many other methods (not depicted) might be invoked during the execution of the asynchronous transaction. In some embodiments, a system administrator or the like identifies the begin method 302 and the end method 304 for a particular asynchronous transaction. For example, the system administrator edits a configuration file (FIG. 1, 9) to specify the begin method 302 and end method 304. The configuration file 9 is used by the probe builder (FIG. 1, 4) to add code to the managed application (FIG. 1, 6) to monitor the asynchronous transaction.

An example of an asynchronous transaction is a user login sequence that invokes methods in different threads of the same process. Note that the asynchronous transaction associated with the begin method 302 and the end method 304 can have multiple instances concurrently invoked. For example, many different users could be logging in at roughly the same time. Each individual user login constitutes one instance of the asynchronous transaction. Also, note that while a single asynchronous transaction is depicted in the managed application 6, many different asynchronous transactions can be monitored. For example, asynchronous transactions with other begin methods 302 and end methods 304 can be monitored.

In the embodiment, the methods 302, 304 are JAVA methods. However, it is not required that the objects 302, 304 be JAVA methods. More generally, the begin method 302 can be any first set of instructions in the managed application 6 that defines the start of the asynchronous transaction, and the end method 304 can be any second set of instructions in the managed application 6 that defines the finish of the asynchronous transaction.

When the begin method 302 is invoked during runtime of the managed application 6, the Async Start Tracer 306 is invoked. In some implementations, the begin method 302 has code 303 inserted therein to cause the Async Start Tracer 306 to be invoked. For example, the probe builder 4 modifies the managed application 6 using bytecode instrumentation to add code 303 that will invoke the Async Start Tracer 306. By stating that the Async Start Tracer 312 is invoked "when" the begin method 302 is invoked it is meant that it is invoked roughly contemporaneously with the invocation of the begin method 302. For example, the start tracer 306 might be invoked prior to completion of begin method 302 execution or shortly thereafter.

The Async Start Tracer 306 is software that generates an asynchronous transaction identifier (asyncID) at runtime. The asyncID uniquely identifies an instance of the asynchronous transaction. That is, if there are multiple instances of the asynchronous transaction, each should have a unique asyncID. As an example, the asyncID may be a user identifier in a case in which the asynchronous transaction is a task that performs a user login. As another example, if the managed application 6 is for handling VoIP telephone calls, then the asyncID might be a unique identifier that is associated with a particular telephone call.

When the end method 304 is invoked during runtime of the managed application 6, the Async Finish Tracer 312 is invoked. In some implementations, the end method 304 has code 303 inserted therein to cause the Async Finish Tracer 312 to be invoked. For example, the probe builder 4 adds code 303 to the end method 304 using bytecode instrumentation.

The Async Finish Tracer 312 generates an asyncID at runtime that uniquely identifies an instance of the asynchronous transaction. Assuming that end method 304 is indeed associated with the same instance of the asynchronous transaction as the begin method 302, the Async Finish Tracer 312 generates the same asyncID as the Async Start Tracer 302. For example, the same user ID is generated by each method 302, 304 for the example of a user login. Thus, note that the asyncID does not need to be passed from the begin method 302 to the end method 304 in order to monitor the asynchronous transaction.

Returning now to the discussion of the Async Start Tracer 302, when the Async Start Tracer 302 is invoked it retrieves (or creates if not present) an async transaction counter 308. An async transaction counter 308 is a set of accumulators to calculate and publish performance metrics for the asynchronous transaction. Examples of the metrics include, but are not limited to, concurrent invocations (instances) of the asynchronous transaction, asynchronous transactions (or requests) per interval, duplicate requests per interval, etc.

In order to retrieve the async transaction counter 308, the Async Start Tracer 306 determines an asynchronous transaction name. Each instance of the asynchronous transaction shares the same asynchronous transaction name. Thus, the asynchronous transaction counter 308 is used to monitor many instances of the asynchronous transaction. The async transaction counter 308 establishes a separate async transaction record 328 for each instance of the asynchronous transaction. The async transaction record 328 may be used to store such information as the start time of this transaction instance or any other properties related to the transaction instance.

The async transaction counter 308 sets up a timer task 310 for each instance of the asynchronous transaction. The timer task 310 is used to determine whether the instance of the asynchronous transaction should be flagged as taking too long to complete. In one embodiment, a stall timeout can be specified for each asynchronous transaction (note that typically the same stall timeout is used for each instance of the asynchronous transaction, but that a different timeout might be used for a specific instance, if desired). If the instance of the asynchronous transaction fails to complete within the stall timeout, the timer task 310 increments a stalled transactions metric and removes the async transaction record 328 stored for the instance of the asynchronous transaction identified by asyncID.

Returning now to the discussion of the Async Finish Tracer 312, the Async Finish Tracer 312 is invoked when the end method is invoked 304. By stating that the Async Finish Tracer 312 is invoked "when" the end method is invoked 304 it is meant that it is invoked roughly contemporaneously with the invocation of the end method 304. For example, the finish tracer 312 might be invoked prior to when the end method 304 completes execution or shortly thereafter. The Async Finish Tracer 312 determines the name of the asynchronous transaction (this will be the same name as the Async Start Tracer 306 used). With the asynchronous transaction name, the asynch finish tracer 312 locates an async transaction counter 308 for the asynchronous transaction. After locating the async transaction counter 308, the Async Finish Tracer 312 uses the asyncID of the asynchronous transaction to retrieve the Async Transaction Record 328 created during the Async Start Tracer 306 execution. It then takes care of updating metrics for the asynchronous transaction. If this invocation of End Method 304 is determined as the last invocation for the asynchronous transaction (Async Tx) then it removes the Async Transaction Record 328.

Figure 4:
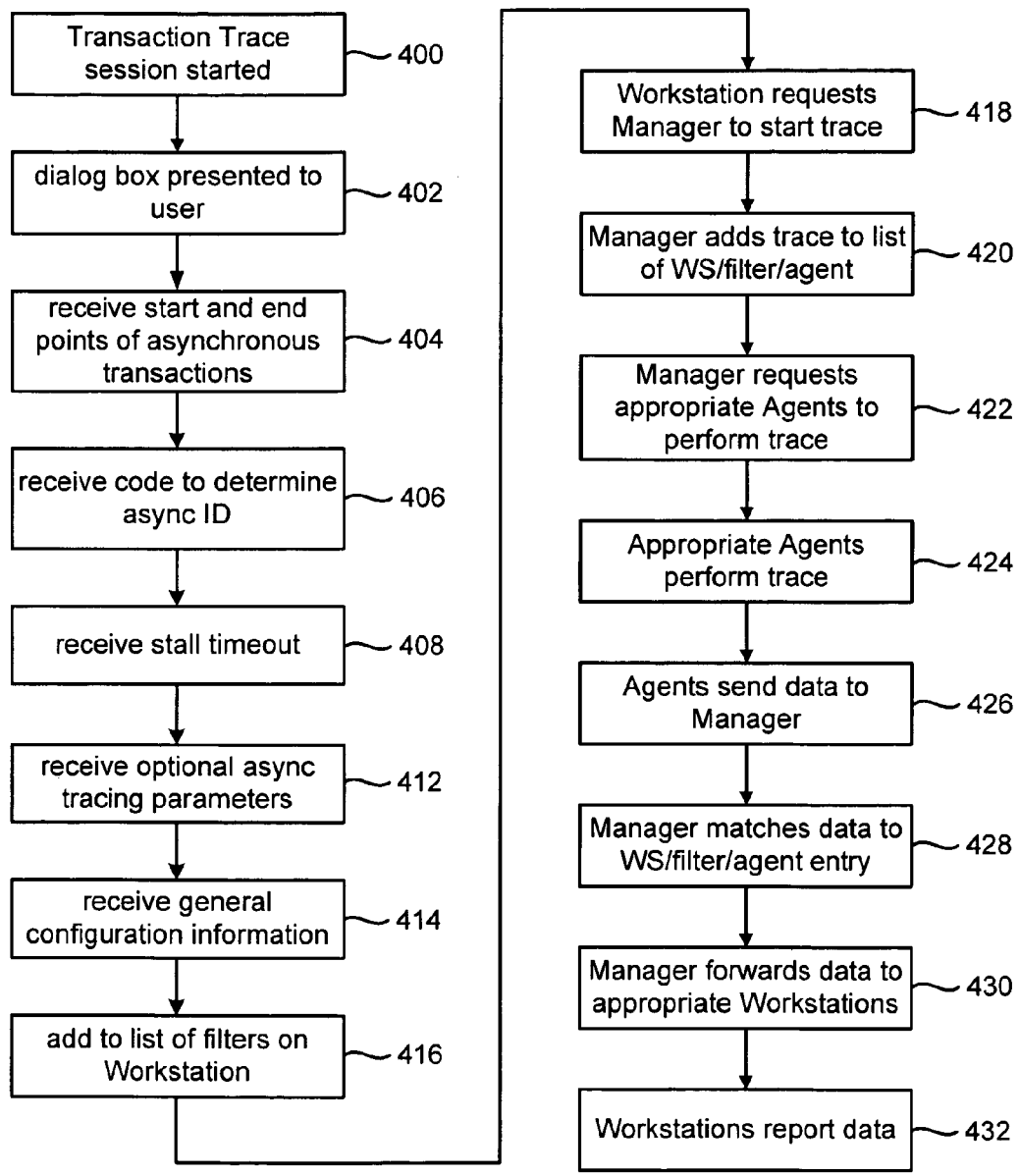
FIG. 4 is a flow chart describing one embodiment of a process for monitoring asynchronous transactions.

FIG. 4 is a flowchart describing one embodiment of a process for monitoring asynchronous transactions. In this process, the user (e.g., system administrator) makes use of an Async Start Tracer 306 and an Async Finish Tracer 312 that are provided for the user. That is, the user is provided with concrete implementations of the tracers 306, 312. As will be seen, the user provides certain information such as how the asyncID should be dynamically generated when the tracers 306, 312 execute. For example, the user determines that a call ID can be generated at run time by the tracers 306, 312. The user provides information that enables the tracers 306, 312 to generate the call ID. Thus information may be added to the configuration file 9. In another embodiment, the user provides their own concrete implementations of the Async Start Tracer 306 and async end tracer 312. In such an embodiment, the user may base the concrete implementation off from an abstract class of the tracers 306, 312 that are provided to the user. In the present example, the user's own concrete implementation is able to generate the call ID at runtime.

In step 400, an asynchronous transaction monitor session is started. In one embodiment of step 400, a window is opened and a user will select a dropdown menu to start an asynchronous transaction monitor session. In other embodiments, other techniques can be used to start the session. In step 402, a dialog box is presented to the user. This dialog box will ask the user for various configuration information that is entered by the user step 404-414.

In step 404, a start point and an end point for the asynchronous transaction is provided by the user. The user may provide this information through the dialog box, although other means for entering the information can also be used. In one embodiment, the start and end points are methods in two different threads in the same process.

In step 406, the user provides a way to determine the asyncID dynamically. For example, the user provides a short procedure that is executed by the provided async tracers 306, 312 to dynamically determine the asyncID for the instance of the asynchronous transaction. Further details are discussed below.

In step 408, the user enters a stall timeout for the asynchronous transaction. The stall timeout is used to determine whether the asynchronous transaction should be reported as stalled. The time can be in any convenient unit such as seconds, milliseconds, microseconds, etc. In some aspects, the asynchronous transactions are very long-lived, in which case the stall timeout might be minutes, hours, days, etc.

In step 412, the user provides various optional parameters for monitoring the asynchronous transaction. For example, the user may provide a resource suffix name. The resource suffix name is used to help categorize metrics for the asynchronous transaction. As a specific example, user logins might be categorized based on the geographic region with which the user is associated. In one embodiment, the resource name suffix is appended to the transaction name. For example, a suffix of "United States" or "Canada" is appended to the transaction name. Thus, the metrics can be categorized by geographic region.

In step 412, the user may also provide information that is used to determine whether monitoring should be initiated for a particular invocation of the begin method 302. Note that the user may not want to monitor every asynchronous transaction that is initiated. For example, the user might only want to monitor a user logins that originate from the United States. This step allows the user to specify conditions that are evaluated at runtime to decide whether metrics should be collected.

Thus a user can specify the conditions that indicate that an asynchronous transaction ended in an error when the end method 304 executes, in step 412. For example, the user can also specify whether a particular response that is received when the end method 304 executes is an error response, in step 412. This may be used for scenarios in which the begin method and end methods are associated with a request/response. For example, the user might provide the following expression, which can be executed by the Async Finish Tracer 312 to determine whether the response being processed by the end method 304 is in an error. For example, the end method 304 might process an HTTP response. In this case, the following expression determines the status code for the HTTP response.

IsError=Http_Response.getStatusCode( )==500;

Thus, if the code of 500 is received, the Async Finish Tracer 312 will be able to report that the response was an error.

Another parameter that the user might specify in step 412 is the condition that determines whether the invocation of the end method 304 is the last invocation. Note that the end method 304 might be invoked multiple times during an instance of an asynchronous transaction. One way to determine whether the last invocation has occurred is to examine a response code. As an example, the user might specify what response code is associated with the final invocation of the end method 304. For example, the end method 304 might generate one of three different responses (e.g., 300, 400, 500). The 400 response might indicate that this is the end of the asynchronous transaction. The user might also specify an expression such as the above expression that is used to determine if an error occurred.

In step 414, general configuration information is provided. For example, the user can identify which agents should perform monitoring by specifying an Agent, a set of Agents, or all Agents. In another embodiment, Enterprise Manager 120 will determine which Agents to use. Another configuration variable that can be provided is the session length. The session length indicates how long the system will perform the monitoring. For example, if the session length is ten minutes, the system will only monitor transactions for ten minutes. At the end of the ten minute period, new transactions that are started will not be monitored; however, transactions that have already started during the ten minute period will continue to be monitored. In other embodiments, at the end of the session length all monitoring will cease regardless of when the transaction started. Other configuration data can also include specifying one or more userIDs, a flag set by an external process or other data of interest to the user. For example, the userID is used to specify that the only transactions initiated by processes associated with a particular one, or more userIDs will be monitored. The flag is used so that an external process can set a flag for certain transactions, and only those transactions that have the flag set will be monitored. Other parameters can also be used to identify which transactions to monitor. In other embodiments all asynchronous transactions that are configured in configuration file 9 and identified with begin method 302 and end method 304 are monitored and their performance metrics are reported by agent 8 to the enterprise manager 120.

The information provided in steps 402-414 is used to create a filter to define which asynchronous transactions executing within the managed application 6 will be monitored and reported to the performance management system. In step 416 of FIG. 4, the workstation adds the new filter to a list of filters on the workstation. In step 418, the workstation requests Enterprise Manager 120 to start the monitor using the new filter. In step 420, Enterprise Manager 120 adds the filter received from the workstation to a list of filters. For each filter in its list, Enterprise Manager 120 stores an identification of the workstation that requested the filter, the details of the filter (described above), and the Agents the filter applies to. In one embodiment, if the workstation does not specify which Agents the filter applies to, then the filter will apply to all Agents.

In step 422, Enterprise Manager 120 requests the appropriate Agents to perform the transaction trace. In step 424, the appropriate Agents perform the transaction trace. In step 426, the Agents performing the transaction trace send data to Enterprise Manager 120. In step 428, Enterprise Manager 120 matches the received data to the appropriate workstation/filter/Agent entry. In step 430, Enterprise Manager 120 forwards the data to the appropriate workstation(s) based on the matching in step 428. In step 432, the appropriate workstations report the data. In one embodiment, the workstation can report the data by writing information to a text file, to a relational database, or other data container. In another embodiment, a workstation can report the data by displaying the data in a GUI. More information about how data is reported is provided below.

Figure 5:
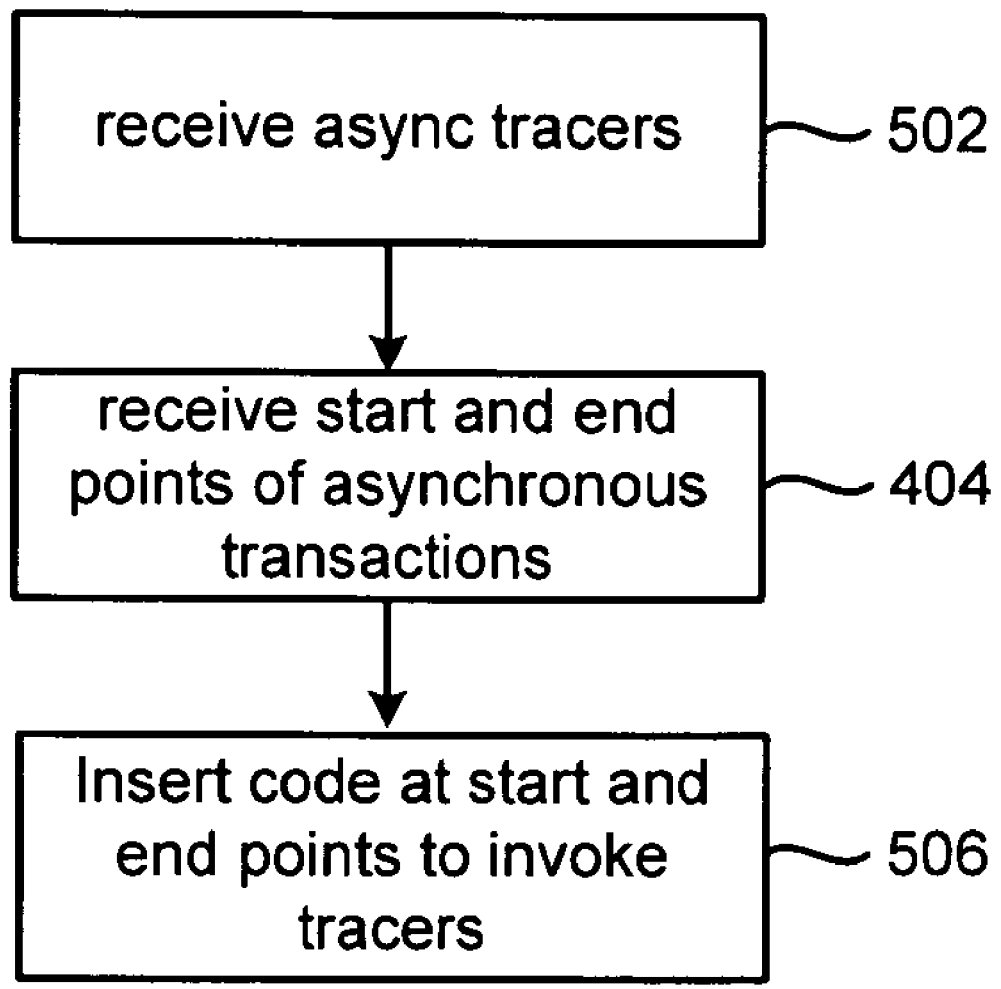
FIG. 5 is a flow chart describing one embodiment of a process for monitoring asynchronous transactions.

In one embodiment, an abstract class for an Async Start Tracer 306 and an abstract class for an Async Finish Tracer 312 are provided for the user. Based on the abstract classes, the user (e.g., system administrator) provides a concrete implementation of the Async Start Tracer 306 and the Async Finish Tracer 312. FIG. 5 depicts one embodiment of a process for setting up the monitoring of asynchronous transactions.

In step 502, concrete implementations of the Async Start Tracer 306 and the Async Finish Tracer 312 are received. For example, a system administrator provides the concrete implementations. FIG. 6A is example interface definition for a concrete implementation for an Async Start Tracer 306 called "MyAsyncStartTracer." The interface definition depicts the names of several methods and their input parameters. The actual implementation of the methods is provided by the user.

The method getStallTimeout returns a "long" number that indicates how long an asynchronous transaction can take to execute prior to being flagged as a stalled transaction. In one implementation, the user inputs the stall timeout for the asynchronous transaction when setting up the monitoring (e.g., step 408 of FIG. 4). This stall timeout might be stored in the configuration file 9. The method getStallTimeout could obtain the stall timeout from the configuration file 9 or elsewhere. In one embodiment, a timer task is periodically executed to identify and report stalled transactions. For example, every 1 second a JAVA timer task is invoked. In one implementation, when a transaction has been identified as stalled the data record that contains metrics for the transaction is deleted (update aggregate data).

The method getAsyncID returns a string that uniquely identifies the asynchronous transaction. The AsyncID is determined at runtime by both the Async Start Tracer 306 and the async end tracer 312. Moreover, for the same transaction the strings will match. As one example, the asyncID could be a user ID. The following are two examples of concrete implementations of getAsyncID method.

EXAMPLE 1

AsyncID=InvocationParam-0.toString( );

EXAMPLE 2

```
Local__RequestEvent=InvocationParam-0.getRequestEvent( );
Local__Request=Local__RequestEvent.getRequest( );
AsyncId=Local__Request.getHeader(java.lang.String Call-ID);
    AsyncId=Local__Request.getHeader(java.lang.String
    Cseq).getMethod( );
```

The doProcessing method allows the user to control whether a particular asynchronous transaction will be monitored or not. In other words, an invocation of the begin method 302 should not necessarily cause monitoring to begin. The user may not want to monitor every asynchronous transaction that is initiated when the begin method 302 is invoked. The scope of the example abstract method is protected. The method returns a Boolean value that indicates whether or not metrics should be collected.

The following is an example of a concrete implementation of a DoProcessing method. The method is used to specify that the asynchronous transaction should be monitored as long as a certain specified field does not have the value "ACK."

```
DoProcessing=InvocationParam
    0.getRequestEvent( ).getRequest( ).getHeader(java.lang.StringCseq).-
    getMethod( ) != ACK;
```

As another example, a system administrator might only want metrics collected for users that reside in the United States. In this case, a concrete implementation of the DoProcessing method is written that is executed in response to the begin method 302 being invoked to determine whether the user that is associated with the asynchronous transaction resides in the United States. For example, the DoProcessing method can check a field in a database. In one implementation, the DoProcessing method returns a "1" if metrics should be collected and a "0" if metrics should not be collected.

The method getResourceNameSuffix returns a string that may be used to group the collected metrics in order to aggregate metrics. For example, the asynchronous transactions that are associated with the begin method 302 may pertain to user logins. However, it may be desirable to group the metrics for user logins based on some other factors. As a particular example, logins might be categorized based on the geographic region with which the user is associated.

FIG. 6B is an example interface definition for a concrete implementation for an Async Finish Tracer 312. The tracer 312 has a method that obtains an asyncID (getAsyncId). This method will return the same value as the method in the Async Start Tracer 306 if the same instance of the asynchronous transaction is being processed. As has been previously discussed, the AsyncID may be based on a parameter or the like that is passed to the end method 312. This parameter may be a user ID, for example. In an application that processes telephone calls, there may be a unique call ID that is associated with each asynchronous transaction.

The Async Finish Tracer 312 has a method for determining whether or not metrics should be collected (doProcessing 710). This method may be similar to the one in the Async Start Tracer 306. The Async Finish Tracer 312 has a method that obtains a resource name suffix (getResourceNameSuffix). This method may be similar to the one in the Async Start Tracer 306.

The method "isError" determines whether the asynchronous transaction ended in an error (isError). This method could be very similar to the information provide by the user in step 212 of the process of FIG. 4. For example, the method could be implemented as follows.

IsError=Http_Response.getStatusCode( )==500;

The method "isLastResponse" determines whether this is the last response for the asynchronous transaction. One technique that might be used to determine whether this invocation of the end method is the last invocation is to examine a response code that is generated. For example, the end method might generate one of three different responses (e.g., 300, 400, 500). The 500 response might indicate that this is the last response for that request.

The method "doMetricsByResponseType" determines whether metrics should be collected by response type. For example, metrics can be aggregated based on a response such as 200 for OK or 400 for bad request.

The method "getResponseType" determines the response type. This method might be used to assist the previously described methods whose actions are based on the response.

Referring now again to the flowchart of FIG. 5, after receiving the async tracers, next, start and end points for the asynchronous transaction are received, in step 404. This step is not discussed in detail as it may be implemented similar to step 404 of the process of FIG. 4.

In step 506 of FIG. 5, code is inserted into the managed application 6 to cause the Async Start Tracer 306 to be invoked when the asynchronous transaction begins and code is inserted into the managed application 6 to cause the Async Finish Tracer 312 to be invoked at least when the asynchronous transaction ends. Note that the end point of the transaction might be invoked multiple times, wherein the Async Finish Tracer 312 is invoked multiple times. In one embodiment, code is inserted into the begin method 302 to invoke the Async Start Tracer 306 when the end method 304 executes, and code is inserted into the end method 304 to cause the Async Finish Tracer 312 to be invoked when the end method 304 executes.

Figure 7A:
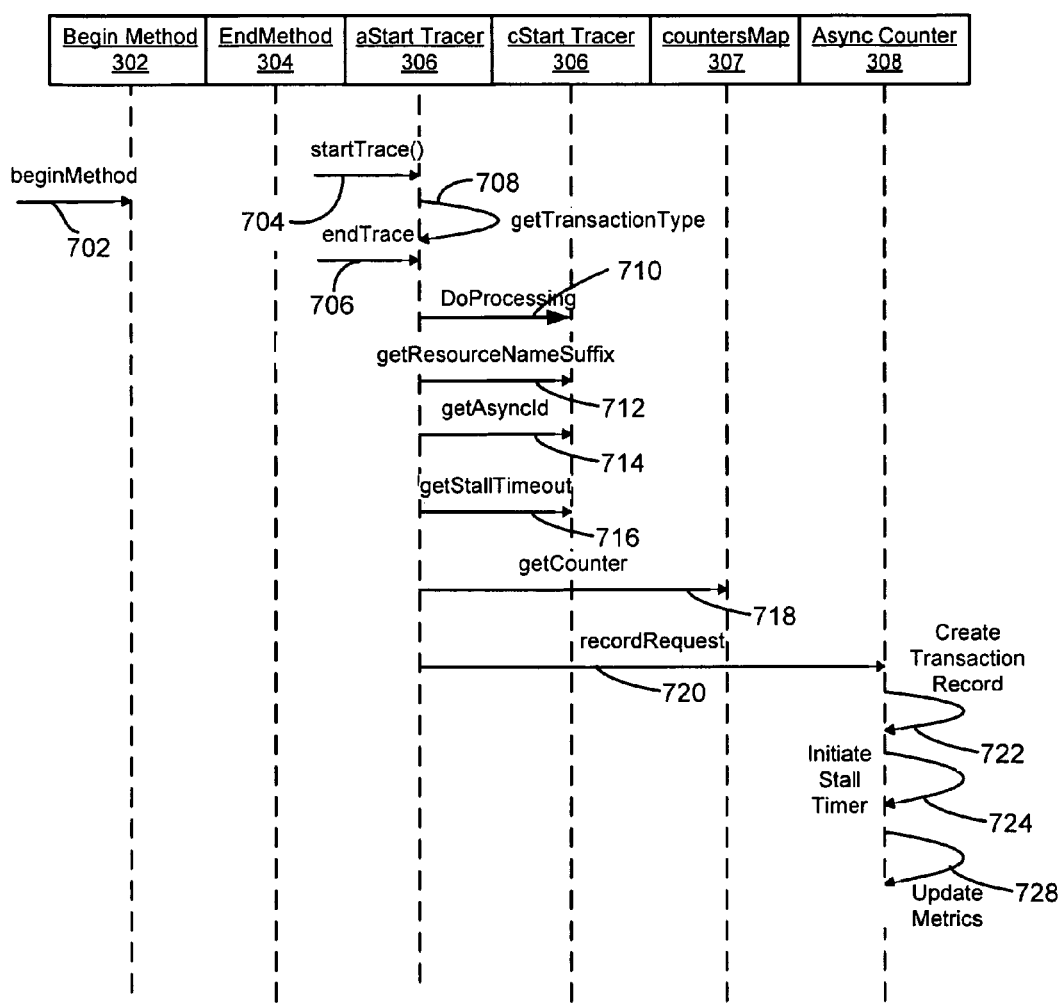
FIG. 7A, FIG. 7B, FIG. 7C, and FIG. 7D are diagrams depicting embodiments of sequences of method invocations during monitoring an asynchronous transaction.

FIG. 7A is a diagram of one embodiment of a sequence of method invocations when monitoring an asynchronous transaction. The diagram depicts several methods at the top that are invoked at various times in the sequence. Prior to discussing the sequence, the methods will be discussed. Begin method 302 refers to a method at the beginning of the asynchronous transaction. End method 304 refers to a method at the end of the asynchronous transaction. In one implementation, begin method 302 and end method 304 are JAVA methods. A system administrator may specify the begin method 302 and end method 304.

The object aStart tracer 306 is an abstract class for a tracer that initiates the collection of metrics associated with the asynchronous transaction. The aStart tracer 306 is responsible for initiating the collection of metrics for a particular asynchronous transaction. The aStart tracer 306 is an instance of an abstract start tracer that may be provided to the user. The aStart tracer 306 has a method startTrace that is executed prior to executing the method being traced. The aStart tracer 306 has a method endTrace that is executed after to executing the method being traced.

The object cStart tracer 306 is an instance of the concrete implementation for a tracer that initiates the collection of metrics associated with the asynchronous transaction. FIG. 6A depicts an example interface definition for a concrete implementation for an Async Start Tracer 306. As previously discussed, in some embodiments, the user (e.g., system administrator) provides the concrete implementation of the Async Start Tracer 306. In other embodiments, a concrete implementation for the Async Start Tracer 306 is provided for the user. However, the user still provides information that is used when executing the concrete implementation, such as a small snippet of code that is used to determine the asyncID.

The object asyncCounter 308 defines the metrics that should be collected for the asynchronous transaction. A counter 308 is an object that is used in the collection and recording of metrics for a transaction. The object async-CountersMap 307 is used to locate a counter for a particular type of asynchronous transaction identified by a transaction name. If a counter 308 does not exist then one is created for that transaction name.

FIG. 8A depicts an example of names of methods (and their parameters) that are included in a counter called "AsyncTx-TraceCounters," which is an interface definition for the async counter 308. The async counter 308 is used for storing metrics for a particular type of asynchronous transaction. In this example, the asynchronous transaction is associated with a request and a response. For example, the asynchronous transaction starts with a begin method 302 that is associated with the request and ends with an end method 304 that is associated with the response. Note that there may be multiple responses to the request (i.e., the end method 304 may be invoked multiple times for a single asynchronous transaction).

The async counter 308 has a method for recording that a request has been made (recordRequest). The recordRequest method is used when the asynchronous transaction starts. That is, when the begin method 302 is invoked a record that a request has been made is established. The input parameters to the record request method are the unique identifier of the asynchronous transaction (transactionId) (the transaction ID may also be referred to herein as an AsyncID), a start time for the asynchronous transaction (startTime), and time period for which the asynchronous transaction can execute without being flagged as stalled (stallTimeout).

The async counter 308 has a method for recording that a response to the request been provided (recordResponse). This method is used when the end method 304 associated with the asynchronous transaction is invoked, but not for the final time. That is, the final response has not yet occurred. The input parameters to the record response method include the unique identifier of the asynchronous transaction (transactionId) and an end time for the asynchronous transaction (endTime). The input parameters also include a Boolean that indicates whether the metrics should be collected by response type (processMetricsbyRespType). The input parameters also include a string "responseType." The string responseType could have a value such as "OK", "bad request," etc.

The async counter 308 has a method for recording metrics when the asynchronous transaction has fully completed (recordLastResponse). Note that in this implementation, the asynchronous transaction is over when last response is received. The input parameters to the record metrics in response to the last response are the same as that as those for the record response method.

The async counter 308 has a method for recording metrics when an error has occurred while processing the asynchronous transaction (recordError). The input parameters to the record error method are the same as that as those for the record response method.

The async counter 308 has a method that records the metrics by response type (recordMetricsByResponseType). The input parameters to this method include a Boolean whose value indicates whether the metrics should be recorded by response type (processMetricsByResponseType). The input parameters also include a string that indicates the response type (responseType). The input parameters also include a long value that indicates the response time (responseTime).

The async counter 308 has a method that determines the number of concurrent invocations of the asynchronous transactions (getConcurrentInvocations). As an example, this method might be used to determine how many login type transactions are concurrently executing. The async counter 308 has a method to disable the collection of metrics (disableMetrics). Finally, the async counter 308 has a method to report that the transaction has stalled (processStalledTransaction)

FIG. 8B depicts an example of operations to be implemented by an object called "AsyncTxTracerRecord," which is an example implementation of an async transaction record 328. The async transaction record 328 is associated with a particular instance of an asynchronous transaction and is created when an asynchronous transaction first begins.

The async transaction record 328 has a method that is used to create a record for a particular asynchronous transaction (AsyncTxTraceRecord). The input parameters to this method are the identifier of the asynchronous transaction (transactionID), a start time for the asynchronous transaction (startTime), and a stall processor. The async transaction record 328 also has a method that initiates a stall timer (getStallTimerTask). In one implementation, this method initiates a JAVA timer task. The async transaction record 328 also has a method that obtains the start time for the asynchronous transaction (getStartTime). Finally, the async transaction record 328 has a method that allows the cancellation of the timer tasks (cancelTasks) like stall timer tasks.

Referring now to the sequence of events in FIG. 7A, the sequence begins when the begin method 302 is invoked (beginMethod 702). For example, when a user logs into a system, a method that is used to authenticate the user may be invoked. The begin method 302 has code added to it to initiate a call to Async Start Tracer 306. For example, through the use of bytecode instrumentation, code was previously added to begin method 302. When discussing FIG. 7A, text that is associated with an arrow refers to a method that is invoked. The head of the arrow points to the object on which the method is invoked.

The first action taken when Async Start Tracer 306 is invoked is to get a transaction name (getTransactionType 708). In one implementation, the transaction name identifies the type of transaction. The transaction name may be a string that identifies what transaction is being measured. As an example, the transaction name might specify the following three elements: a particular web site, a login application for the website, and a login process for the login application. In one implementation, the string is obtained from a configuration file 9. A system administer can add the transaction name to the configuration file 9.

Next, the abstract start tracer 306 invokes methods in other objects to start the collection of metrics for the asynchronous transaction. First, a determination is made as to whether metrics should be collected for this asynchronous transaction by the doProcessing method 710. The doProcessing method 710 is in the concrete start tracer 306. If processing is not to be done then no further actions occur. Assuming processing is to be done, the concrete start tracer 306 then invokes other methods as to be discussed next.

The abstract start tracer 306 obtains a resource name suffix by invoking getResourceNameSuffix 712 in the concrete start tracer 306. The resource name suffix can be used to associate the asynchronous transaction with a particular group (or groups). In one implementation, the resource name suffix is appended to the transaction name. For example, the resource name suffix can specify a geographic region that is associated with a login process. This region is appended to the transaction name such that the metrics can be grouped not only by transaction name (e.g., logins), but also based on the geographic region associated with logins Asynchronous tracing can be used to publish metrics for multiple resource paths for the same start and finish points. In such scenarios the ResourceNameSuffix value can be used to specify the suffix to be appended to the resource path. For example, the same processRequest/processResponse and start/finish points may be used to publish metrics for different messages. Examples of different messages for a voice over IP telephone application are a messages to REGISTER a user, a message to INVITE another user to take part in a telephone call, etc. Note these different messages could involve the same start and end point. In other words, they could have the same begin method 302 and end method 304. The ResourceNameSuffix should be computable from the parameters available at start and finish points.

Next, the Async Start Tracer 306 obtains a unique identifier for the asynchronous transaction (getAsyncID 714). The asynchID can be anything that can be determined at both the begin method 302 and the end method 304 and that is a unique value for each instance of an asynchronous transaction.

Next, the Async Start Tracer 306 obtains a stall timeout (getStallTimeout 716). The stall timeout defines how long the asynchronous transaction is allowed to run before it is considered to have stalled. The stall timeout may be obtained from a configuration file, which was populated based on user provided information. Alternatively, the stall timeout can be determined by executing a stall routine in a concrete implementation provided by the user.

Next, the Async Start Tracer 306 tries to locate a counter for the asynchronous transaction. Note that this is for the asynchronous transaction and not the instance of the asynchronous transaction. To do so, the Async Start Tracer 306 invokes (getCounter 718) in the async counter map object. The async counter 308 may be obtained based on the transaction name (note the name can in effect specify the type of transaction).

Next, the Async Start Tracer 306 calls the async counter 308 to record that a request has been received (recordRequest 720). More generally, the call to the async counter 308 indicates that the asynchronous transaction has begun. The async transaction counter 308 creates an asynchronous transaction record 328 for the asynchronous transaction (createTransactionRecord 722). FIG. 8B depicts an example of an asynchronous transaction record 328. The async transaction counter 308 also initiates a stall timer task 310 (initiateStallTimer 724). Finally, the async transaction counter 308 updates metrics (updateMetrics 728).

Figure 7B:
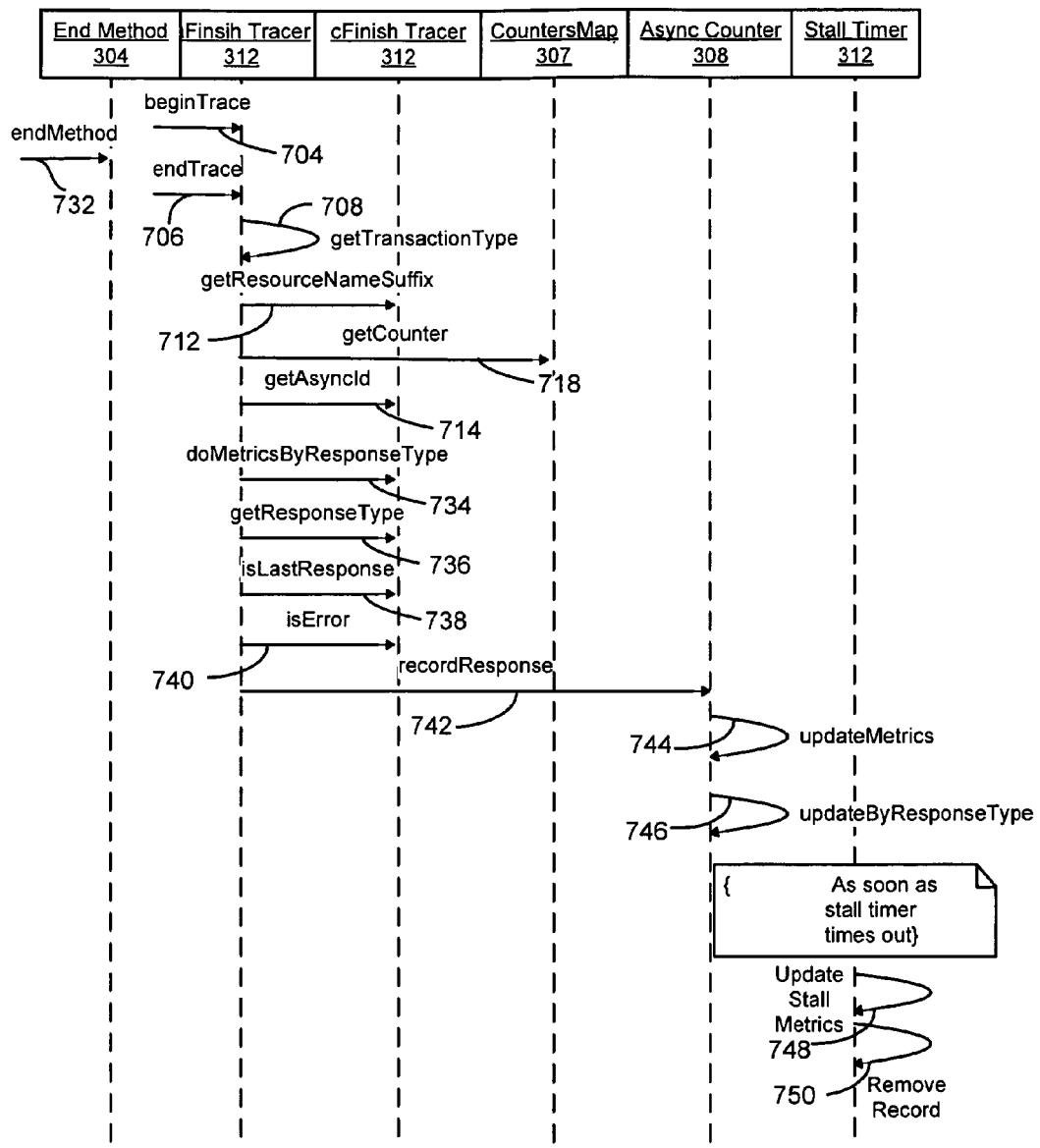

FIG. 7B depicts a diagram of one embodiment of a sequence of method invocations associated with monitoring an asynchronous transaction. Specifically, this sequence occurs when an end method 304 is invoked (FIG. 7A was for the begin method 304). Note that an end method 304 could be invoked more than once before the asynchronous transaction completes. The particular sequence in FIG. 7B describes a sequence associated with a non-final invocation of the end method 304. It also shows the sequence (748-750) associated with the condition in which the asynchronous transaction takes longer than the stall timeout specified.

Prior to discussing the sequence, objects that are used in the sequence will be discussed. The object aFinish tracer 312 is an abstract class for the Async Finish Tracer 312 that finishes the collection of metrics associated with the asynchronous transaction. The object cFinish tracer 312 is a concrete implementation for the Async Finish Tracer 312. An example interface definition for a concrete implementation of the Async Finish Tracer 312 is depicted in FIG. 6B. The stall timer 312 is an object that is used to clean up the record for a transaction when it stalls. Other objects in FIG. 7B have already been discussed.

The sequence begins with the end method 304 being invoked (endMethod 732). Continuing with the example in which the begin method 302 was a user login, the end method 304 might perform checking a database for user credentials. Note that this end method 304 might be invoked multiple times during the login process. As with begin method 302, end method 304 has code added to it by, for example, bytecode instrumentation to cause an Async Finish Tracer 312 to be invoked in association with end method 304 being invoked.

Thus, the next action in the sequence is for the Async Finish Tracer 312 to be invoked. When the Async Finish Tracer 312 is invoked the initial set of actions are similar to those for the Async Start Tracer 306. One action is to obtain the transaction name (getTransactionType 708). Furthermore, a resource suffix name is obtained (getResourceNameSuffix 712). As has been previously discussed, the suffix may be appended to the transaction name to aggregate metrics.

One action taken by the Async Finish Tracer 312 is to locate a counter for the asynchronous transaction. The Async Finish Tracer 312 invokes the counters map (getCounter 718) to find a counter. Typically, at least the transaction name is used to locate the counter. The resource suffix name, if available, may also be used.

Another action taken by the Async Finish Tracer 312 is to obtain an asyncID (getAsyncID 714). The asyncID is obtained in a manner such that it will match with the asyncID for the start trace for the same instance of an asynchronous transaction. Using the example in which the asyncID is a user ID, that same user ID is obtained by the finish tracer for the same instance of an asynchronous transaction.

In some embodiments, metrics can be collected by response type. For example, the metrics can be aggregated by the status code of the response, such as 200 (OK) or 400 (Bad request). The concrete implementation of the Async Finish Tracer 312 has code that indicates whether metrics should be collected by response type. For example, the concrete Async Finish Tracer 312 may have a Boolean that is evaluated at runtime to determine whether or not to collect metrics by response type. The concrete Async Finish Tracer 312 also may have data that provides specifics, such as collecting by status code.

As previously noted, the end method 304 could be invoked multiple times before the asynchronous transaction finishes. The isLastResponse method 738 is used to determine if an invocation is the last invocation that ends an asynchronous transaction. In one implementation, the concrete Async Finish Tracer 312 has a Boolean that is evaluated at runtime to determine whether this is the last invocation of the end method 304.

Next in the sequence, a determination is made as to whether an error happened during the asynchronous transaction. Referring to FIG. 6B, the user may supply a concrete implementation for an isError routine 740 that is executed to determine whether an error occurred.

In this sequence it is assumed that no error occurred. Next, the metrics are updated (recordResponse 742). In this example, the async transaction counter 308 that was identified earlier is invoked to update the metrics. For example, referring to FIG. 8A, the recordResponse method 742 of "AsyncTxTraceCounters" is executed.

The updateMetrics method 744 is used to update the metrics. The metrics are updated by response type if desired. Referring to FIG. 8A, the method recordMetricsByResponseType 746 is executed at this time. Note that this condition is determined in the call to "doMetricsByResponseType 734," which is in the Async Finish Tracer 306 (see FIG. 6B). Thus, if it is determined that metrics should be aggregated by response type, then such aggregation is performed.

It may be that the asynchronous transaction fails to complete within the stall timeout. If so, then the stall timer 312 is activated. The stall timer 312 removes the asynchronous transaction record 328 (removeRecord 750) and updates stall metrics (updateStallMetrics 748). In this timeout scenario, the Async Finish Tracer 312 might not be invoked at all.

Figure 7C:
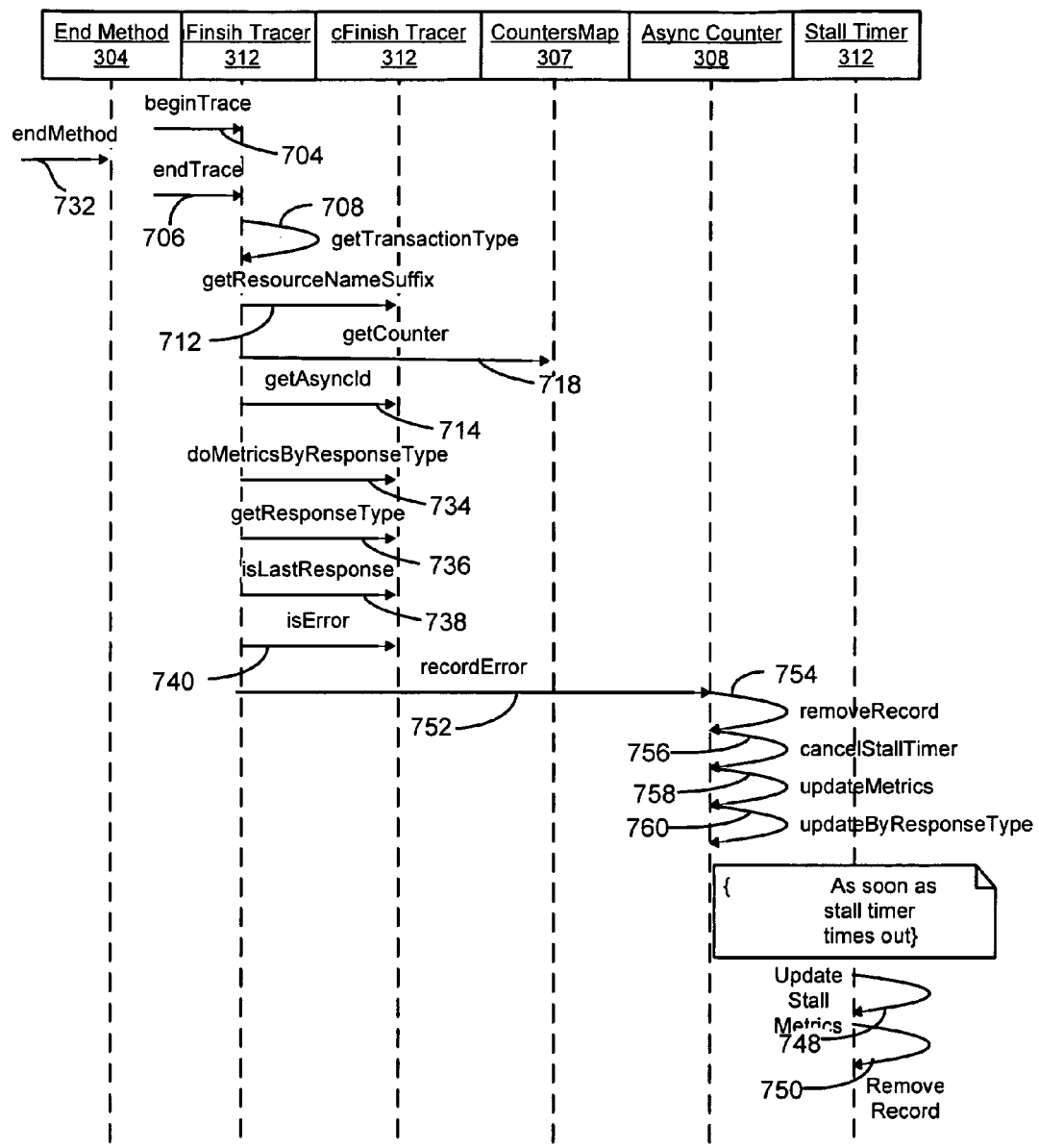

FIG. 7C depicts a diagram of one embodiment of a sequence of method invocations that occur when monitoring an asynchronous transaction. Specifically, this sequence occurs when the asynchronous transaction incurs an error. The sequence occurs when an end object 304 is invoked; therefore, the sequence is similar to FIG. 7B. However, whereas the sequence of 7B is for a normal response, the sequence of 7C is for an error response. Up until the isError method is executed, the sequence of method invocations is the same as for FIG. 7B. However, the isError method returns an indication that an error occurred. Afterwards, the error is recorded (recordError 752) by the async counter 308 that was identified based on the transaction name earlier.

Steps performed by the async counter 308 in recording the error include removing the async transaction record 328 (removeRecord 754), cancelling the stall timer 312 (cancelStall- Timer 756), updating the metrics (updateMetrics 758). The metrics are updated by response type (updateMetricsByResponseType 760) if desired.

As with the case in FIG. 7B, the asynchronous transaction may fail to finish within the stall timeout, in which case the stall timer 312 is activated.

Figure 7D:
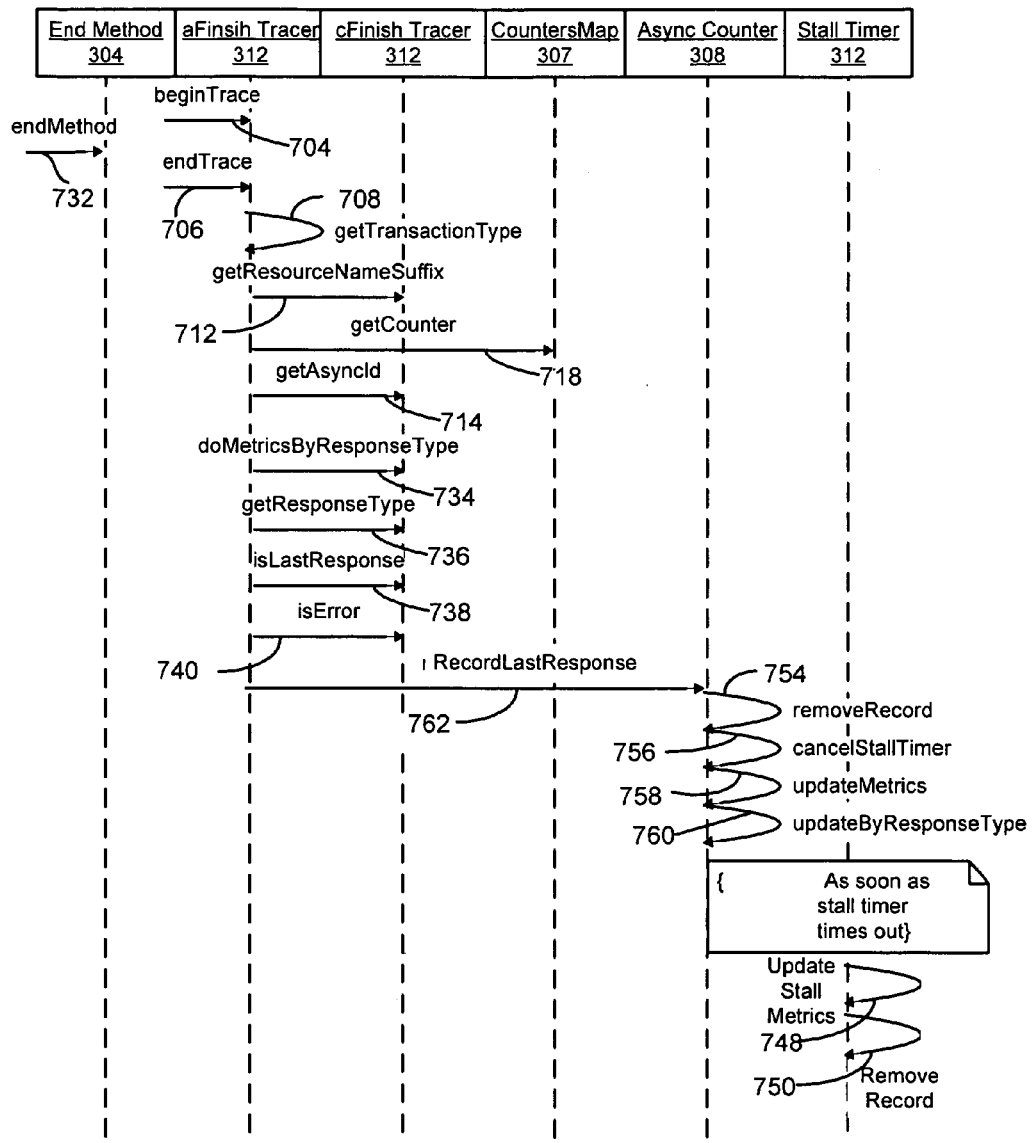

FIG. 7D depicts a diagram of one embodiment of a sequence of method invocations that occur in various objects when monitoring an asynchronous transaction. Specifically, this sequence is associated with the final invocation of the end method 304. That is, this sequence is for the end of the asynchronous transaction. The sequence occurs when an end, method 304 is invoked; therefore, the sequence is similar to FIG. 7B. However, whereas the sequence of 7B is for a non-final response, the sequence of 7D is for an final response.

Up until the isError method is executed, the sequence of method invocations is the same as for FIG. 7B. However, since this is the last invocation of the end method 304, this will be the last response in the asynchronous transaction. Thus, to do last response processing the method "recordLastResponse" 762 is invoked.

The async counter 308 performs similar processing as it would if an error occurred, except for the fact that the metrics updated in this sequence during updateMetrics 758 are different. That is, the async transaction record 328 is removed (removeRecord 754), the stall timer 312 is cancelled (cancelStallTimer 758), the metrics are updated (updateMetrics 758). Also, the metrics may be updated by response type (updateMetricsByResponseType 760). As with the case in FIG. 7C, the asynchronous transaction may fail to finish within the stall timeout, in which case the stall timer 312 is activated.

FIG. 9 is a flowchart of one embodiment of a process for monitoring long-lived asynchronous transactions. A given asynchronous transaction may span multiple processes. As a particular example, an asynchronous transaction may start on a "front end" and may make many remote calls at one or more "back ends." As an example, the front end is the first portion of code that is executed when a user logs into a online airline reservation system. The front end could be a JAVA servlet, for example. The back end is the last portion of code that is executed prior to making a call to a remote system. The asynchronous transaction might make many calls to remote systems. Thus, the asynchronous transaction might not finish for a very long time. Process 900 allows a system administrator to gain insight into what is transpiring with the asynchronous transaction while it is still running. For example, process 900 can provide some information about those remote calls, even though the asynchronous transaction has not yet finished.

In step 902, a first unique identifier is associated with an asynchronous transaction that begins. As an example, a user accesses a web site and logs in and a JAVA servlet is invoked. The asynchronous transaction begins in a first thread (in a first process).

In step 904, the first unique identifier is forwarded to a second thread that handles the asynchronous transaction. The second thread may be executing on the same computer system as the first thread. As an example, the second thread may be handling credit card authorization for the user who is making an online airline reservation.

In step 906, the second unique identifier is forwarded to a third thread that handles the asynchronous transaction. The third thread may be executing on a different computer system from the second thread. As an example, the third thread is invoked as a result of a remote procedure call from the second thread. As a specific example, the third thread may do some tracking related to credit card purchases.

Note that there may be a substantial gap in time between when the remote procedure call is made and completes. However, it may be desirable to have transaction information for the asynchronous transaction prior to when it completes. In step 908, transaction information is provided for the asynchronous transaction. Note that this occurs prior to completion of the asynchronous transaction. As an example, the transaction information is provided just after the remote procedure call is made. Thus, partial visibility into the asynchronous transaction is provided.

In step 908, the asynchronous transaction completes. For example, all of the remote calls that were initiated have completed and the original user action of making the airline reservation is completed.

Note that process 900 allows the system administrator to gain an understanding of how the asynchronous transaction impacts other systems. For example, the asynchronous transaction can cause many different processes to be invoked as a result of remote calls. The system administrator can gain a better understanding of why these processes are being invoked by examining the transaction information while the asynchronous transaction is still running.

The foregoing detailed description of embodiments have been presented for purposes of illustration and description. It is not intended to be exhaustive or to limit to the precise form disclosed. Many modifications and variations are possible in light of the above teaching. The described embodiments were chosen in order to best explain principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A machine implemented set of instructions for monitoring asynchronous transactions, comprising the steps of:
   determining a first unique identifier when a first set of instructions executes;
   associating the first unique identifier with an asynchronous transaction;
   determining a second unique identifier when a second set of instructions executes;
   determining that the first unique identifier and the second unique identifier match; and
   determining that the asynchronous transaction started with the first set of instructions and completed with the second set of instructions at least in part in response to determining that the first unique identifier and the second unique identifier match.

2. The machine implemented set of instructions as recited in claim 1, wherein the determining the first unique identifier is based on information that is supplied to the first set of instructions during runtime, and the determining the second unique identifier is based on information that is supplied to the second set of instructions during runtime.

3. The machine implemented set of instructions as recited in claim 2, wherein the first unique identifier and the second unique identifier are unique identifiers that are associated with the asynchronous transaction.

4. The machine implemented set of instructions as recited in claim 1, further comprising:
   automatically inserting first code into the first set of instructions, the first set of instructions is associated with the start of the asynchronous transaction, the first code identifies a first routine that has first instructions for determining the first unique identifier at runtime; and automatically inserting second code into the second set of instructions, the second set of instructions is associated with the end of the asynchronous transaction, the second code identifies a second routine that has second instructions for determining the second unique identifier at runtime.

5. The machine implemented set of instructions as recited in claim 1, further comprising:

creating a record for storing metrics for the asynchronous transaction;

updating the record of metrics for the asynchronous transaction in response to determining that the second identifier matches the first identifier.

6. The machine implemented set of instructions as recited in claim 1, wherein the first set of instructions is executed followed by multiple executions of the second set of instructions.

7. The machine implemented set of instructions as recited in claim 6, further comprising:

determining whether metrics for the asynchronous transaction should be collected based on conditions at runtime when executing the first or second set of instructions.

8. The machine implemented set of instructions as recited in claim 6, further comprising:

determining when executing the second set of instructions whether the invocation of the second set of instructions is the last invocation.

9. The machine implemented set of instructions as recited in claim 6, further comprising:

determining whether the runtime conditions during execution of second set of instructions indicate that an error occurred when processing the asynchronous transaction.

10. The machine implemented set of instructions as recited in claim 1, further comprising:

determining that the asynchronous transaction failed to complete within an allotted time; and reporting that the asynchronous transaction failed to complete within the allotted time.

11. The machine implemented set of instructions as recited in claim 1, further comprising:

generating a third unique identifier for the asynchronous transaction;

forwarding the third unique identifier to a third set of instructions that processes the asynchronous transaction downstream from the second set of instructions, the second set of instructions is in a first process, the third set of instructions is in a second process;

recording transaction information that pertains to performance of the asynchronous transaction prior to the third set of instructions handling the asynchronous transaction; and providing the recorded transaction information in a user interface prior to completion of the asynchronous transaction.

12. A machine implemented method for monitoring asynchronous transactions, comprising the steps of:

automatically inserting first code into a first method, the first method is associated with the start of an asynchronous transaction, the first code identifies a first routine that has first instructions for determining a first unique identifier at runtime;

automatically inserting second code into a second method, the second method is associated with the end of the asynchronous transaction, the second code identifies a second routine that has second instructions for determining a second unique identifier at runtime; and determining that an instance of the asynchronous transaction started in the first method and completed in the second method at least in part in response to determining that the first identifier and the second identifier match.

13. The machine implemented method as recited in claim 12, further comprising:

executing the first routine in response to the first method being invoked to determine the first identifier;

executing the second routine in response to the second method being invoked to determine the second identifier; and determining that the first method and the second method are the start and the end of the asynchronous transaction at least in part in response to determining that the first identifier and the second identifier match.

14. The machine implemented method as recited in claim 12, wherein the determining the first unique identifier is based on information that is supplied to the first method during runtime, and the determining the second unique identifier is based on information that is supplied to the second method during runtime.

15. The machine implemented method as recited in claim 14, wherein the first unique identifier and the second unique identifier are unique identifiers that are associated with the asynchronous transaction.

16. The machine implemented method as recited in claim 12, further comprising:

creating a record for storing metrics for the asynchronous transaction;

updating the record of metrics for the asynchronous transaction in response to determining that the second identifier matches the first identifier.

17. The machine implemented method as recited in claim 12, wherein the first method is executed followed by multiple executions of the second method.

18. The machine implemented method as recited in claim 17, further comprising:

determining whether metrics for the asynchronous transaction should be collected based on conditions at runtime when executing the first method or the second method.

19. The machine implemented method as recited in claim 17, further comprising:

determining when executing the second method whether the invocation of the second method is the last invocation of the second method for the asynchronous transaction.

20. The machine implemented method as recited in claim 17, further comprising:

determining whether the runtime conditions during execution of second method indicate that an error occurred when processing the asynchronous transaction.

21. The machine implemented method as recited in claim 12, further comprising:

determining that the asynchronous transaction failed to complete within an allotted time; and reporting that the asynchronous transaction failed to complete within the allotted time.

22. A system comprising a processor and a computer storage medium coupled to the processor, the computer storage medium has stored thereon instructions which, when executed on the processor, implement a method for monitoring an asynchronous transaction, the method comprises the steps of:

receiving an identification of a begin point and an end point of an asynchronous transaction;

determining a first unique identifier when the first point executes;

creating a record to store metrics for the asynchronous transaction;

associating the first unique identifier with the record;

determining a second unique identifier when the second point executes;

locating the record based on the second unique identifier, the second unique identifier matches the first unique identifier; and updating metrics in the record.

23. A machine implemented method for monitoring asynchronous transactions, comprising the steps of:

associating a first unique identifier with an asynchronous transaction that starts in a first thread;

forwarding the first unique identifier for the asynchronous transaction to a second thread that handles the asynchronous transaction on behalf of the first thread;

forwarding a second unique identifier for the asynchronous transaction to a third thread that handles the asynchronous transaction downstream from the second thread; and providing transaction information for the asynchronous transaction in a user interface prior to completion of the asynchronous transaction, the transaction information pertains to execution of the asynchronous transaction in the second thread or execution of the asynchronous transaction prior to the second thread.

24. A machine implemented method as recited in claim 23, wherein the second thread is in a first computer system and the third thread is in a second computer system.

25. A machine implemented method as recited in claim 24, further comprising:

providing transaction information for the asynchronous transaction that pertains to execution of the asynchronous transaction in the first computer system and the second computer system.

* * * * *